United States Patent [19]
Mimura et al.

[11] Patent Number: 5,309,113
[45] Date of Patent: May 3, 1994

[54] FSK DATA DEMODULATOR

[75] Inventors: Masahiro Mimura; Makoto Hasegawa, both of Tokyo; Kazunori Watanabe, Yokohama; Hiroyuki Harada, Kanazawa, all of Japan

[73] Assignee: Matsushita Electric Industrial Co., Ltd., Japan

[21] Appl. No.: 952,657

[22] Filed: Sep. 28, 1992

[30] Foreign Application Priority Data

Sep. 27, 1991 [JP] Japan ................. 3-248819
Jul. 29, 1992 [JP] Japan ................. 4-202168

[51] Int. Cl.⁵ ................................ H03D 3/00
[52] U.S. Cl. .................. 329/302; 329/303; 375/80; 375/88
[58] Field of Search ............ 329/300, 302, 303; 375/45, 80, 88-91

[56] References Cited

U.S. PATENT DOCUMENTS

| | | | |
|---|---|---|---|
| 2,652,451 | 9/1953 | Feten | 375/91 |
| 3,439,283 | 4/1969 | Danielson | 329/302 |
| 3,568,067 | 3/1971 | Williford | 329/302 X |
| 4,359,691 | 11/1982 | Robson | 329/303 |
| 4,618,967 | 10/1986 | Vance et al. | 375/80 |
| 5,023,562 | 6/1991 | Gumussoy | 329/303 |

FOREIGN PATENT DOCUMENTS 0168752  9/1984  Japan ................. 375/88
60-39962  3/1985  Japan .

Primary Examiner—David Mis
Attorney, Agent, or Firm—Parkhurst, Wendel & Rossi

[57] ABSTRACT

An FSK demodulator for demodulating first and second baseband signals obtained from a received frequency shift keying signal, the first and second baseband signals having a quadrature relation therebetween, a lead and lag relation between the first and second baseband signals being changed in accordance with frequency shift from a carrier frequency of the frequency shift keying signal, comprises: a voltage change judging circuit for judging whether a magnitude of the first baseband signal increases or decreases within a predetermined interval; and an inverting circuit responsive to an output of the voltage change judging circuit and the second baseband signal for outputting a demodulated signal produced by inverting the second baseband signal in accordance with the output of the voltage change judging circuit. In addition, a second voltage change judging circuit and a second inverting circuit and a combining circuit for combining the results of said first and second inverting circuits may be provided to improve noise resistance. Inflection points in the baseband signal are detected to select one output from the first, second inverting circuit and the combining circuit in accordance with detection of the inflection points.

28 Claims, 10 Drawing Sheets

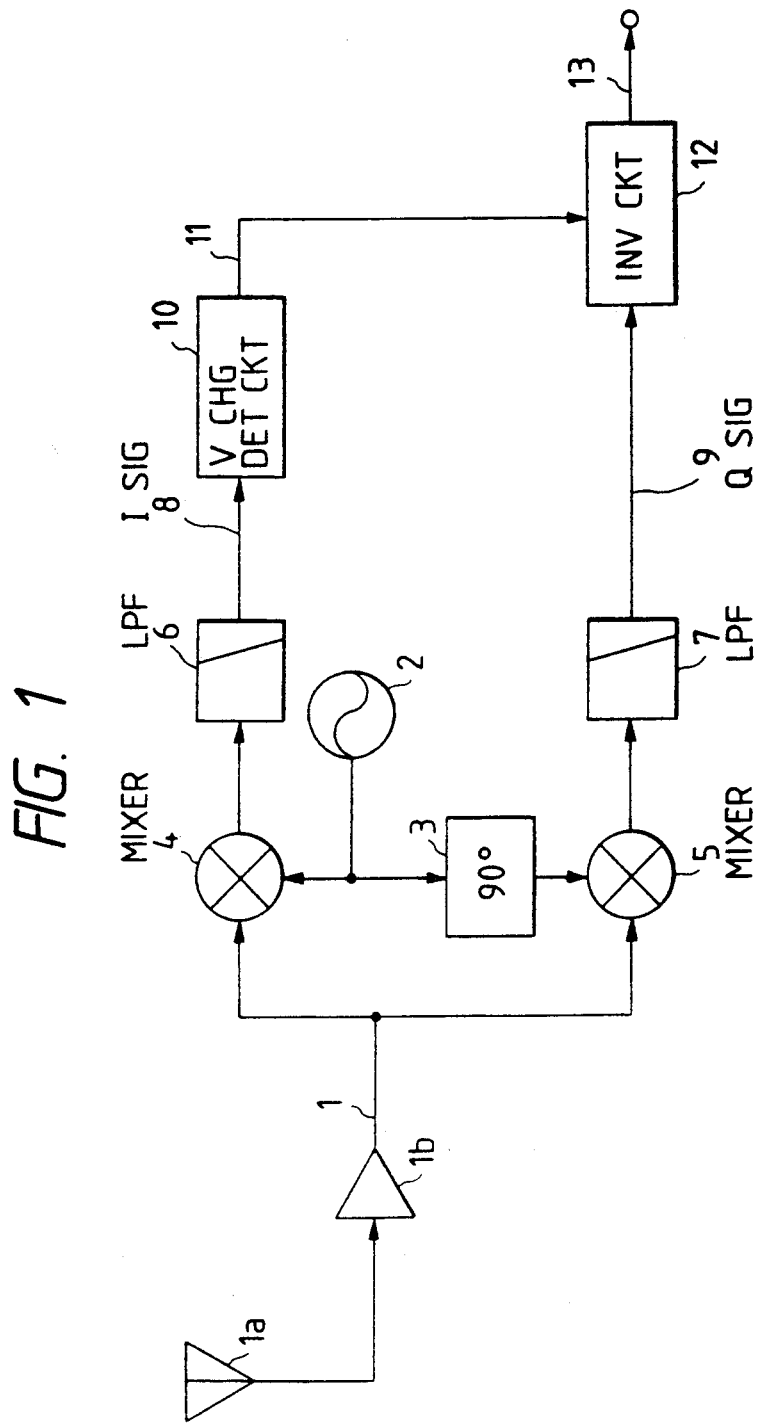

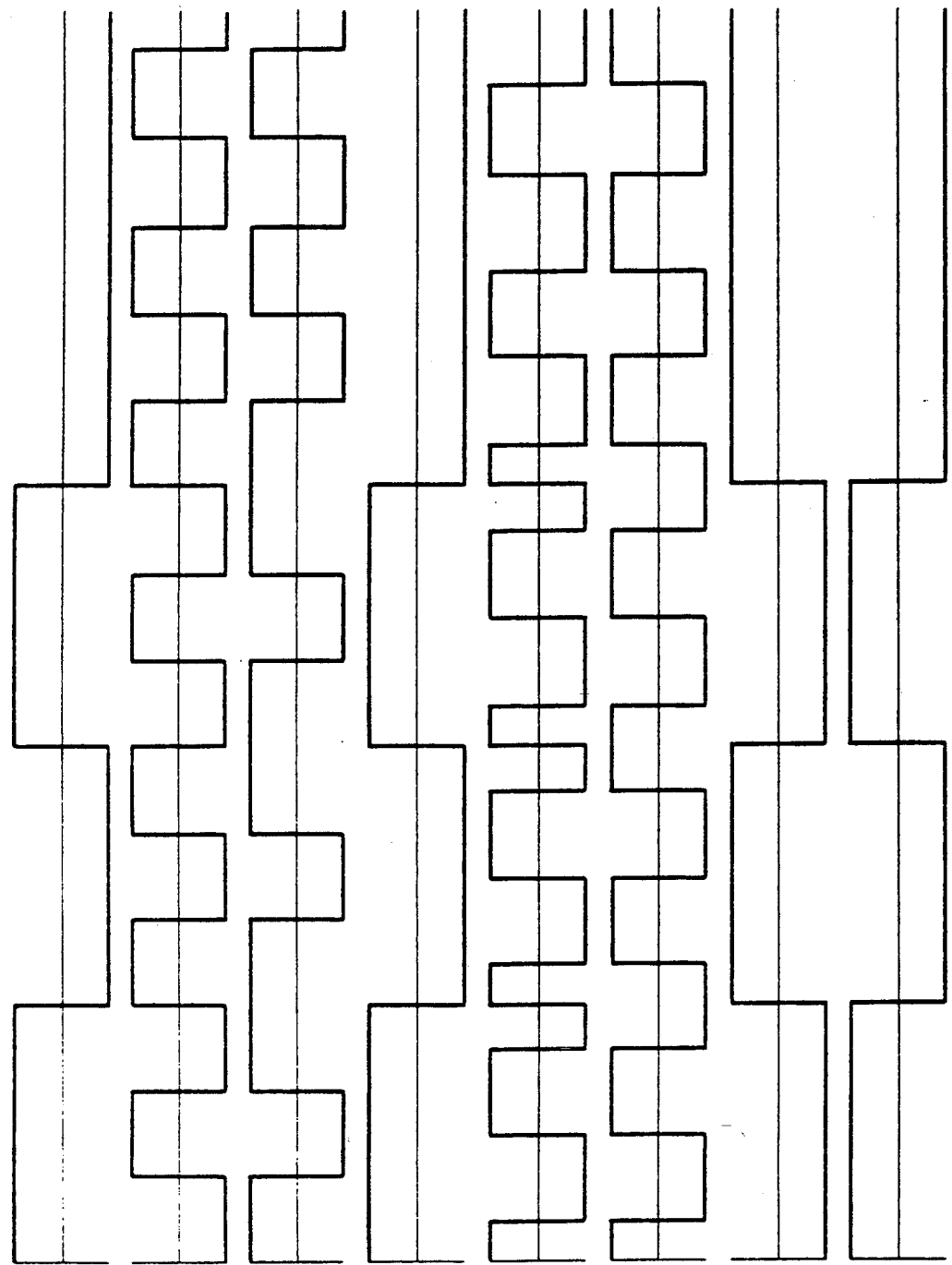

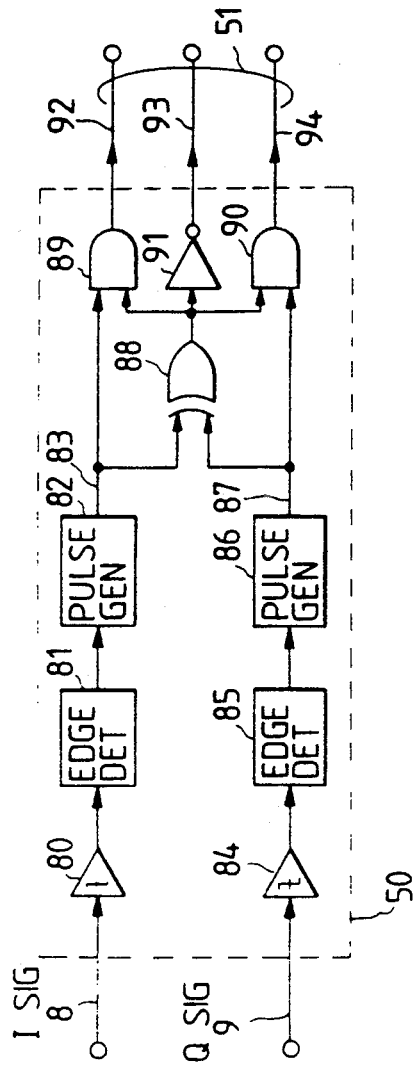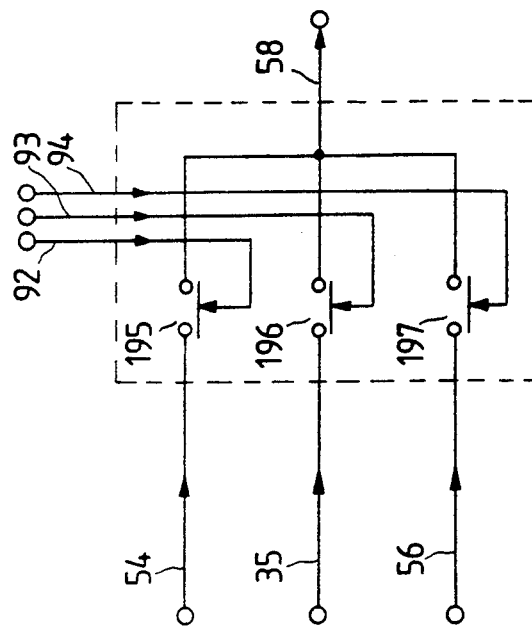

FSK DATA DEMODULATOR

BACKGROUND OF THE INVENTION

1. Field of the Invention

This invention relates to an FSK data demodulator for demodulating FSK (frequency shift keying) data and particularly to an FSK data demodulator for demodulating FSK data with a converting circuit for converting a transmitted FSK signal into a baseband signal directly.

2. Description of the Prior Art

An FSK data demodulator is known. Such FSK data demodulator demodulates a received FSK data signal such that it obtains quadrature baseband signals and it decodes the quadrature baseband signal to a data signal. It obtains the baseband signal by direct conversion. That is, the baseband signals are directly converted from the received data signal.

Such a prior art FSK demodulator is disclosed in Japanese patent application provisional publication No. 58-19038. Hereinbelow will be simply described a prior art FSK data demodulator with reference to FIG. 10.

In FIG. 10, an FSK received signal applied to an input 60 is supplied to a mixer 61 and to a mixer 63 through a ninety-degree phase shifter 62 at the same time. The received signal and an output of the ninety-degree phase shifter 62 are down-converted by mixing them with an output signal of a local oscillator 64 respectively, and then, passed through low pass filters 65 and 66 for passing baseband signals to obtain I and Q signals 67 and 68 respectively. The I signal 67 is formed into a digital signal 70 by an amplitude limiting amplifier 69. The Q signal 68 is subjected to phase shifting by a ninety-degree phase shifter 71, and then, is formed into a digital signal 73 by an amplitude limiting amplifier 72. Data is decoded by a logic operation circuit 74 having inputs 70 and 73.

The reason why the direct conversion is adopted is that it is easy to implement its circuit in an IC because the circuit structure is simple. However, if communication speed is high such that a symbol rate of a transmitted data is equal to or higher than an FSK phase shift amount, there is a problem that the ninety-degree phase shifter should have an extremely broad band because it is necessary to shift a phase of the received data signal from a low frequency to a frequency of an order obtained by a sum of the modulation frequency shifting and the symbol rate to effect accurate decoding. Generally, a ninety-degree phase shifter capable of phase shifting a signal of a low frequency has a difficulty in implementation of its circuit into an integrated circuit (IC) because it needs a large capacitor in the circuit configuration. Thus, it prevents saving power consumption and miniaturization.

Moreover, in the actual receiver including the prior art FSK demodulator, there is a problem that if a high speed FSK signal mentioned above is received, demodulation is difficult because the signal to be phase-shifted contains a lot of discontinuous points, so that phase shifting becomes imperfect by the ninety-degree phase shifter and is difficult in demodulation.

SUMMARY OF THE INVENTION

The present invention has been developed in order to remove the above-described drawbacks inherent to the conventional FSK data demodulator.

According to the present invention there is provided an FSK demodulator for demodulating first and second baseband signals obtained from a received frequency shift keying signal, the first and second baseband signals having a quadrature relation therebetween, a lead-and-lag relation between the first and second baseband signals being changed in accordance with frequency shift from a carrier frequency of the frequency shift keying signal, comprising: a voltage change judging circuit for judging whether a magnitude of the first baseband signal increases or decreases within a predetermined interval; and an inverting circuit responsive to an output of the voltage change judging circuit and the second baseband signal for outputting a demodulated signal produced by inverting the second baseband signal in accordance with the output of the voltage change judging circuit.

According to the present invention there is also provided a demodulator as mentioned above, further comprising: a second voltage change judging circuit for judging whether a magnitude of the second baseband signal increases or decreases within the predetermined interval; a second inverting circuit responsive to an output of the second voltage change judging circuit and the first baseband signal for outputting a second demodulated signal produced by inverting the output of the second voltage change judging circuit in accordance with the first baseband signal, and a combining circuit for combining the first demodulated signal with the second demodulated signal.

In addition, a second voltage change judging circuit and a second inverting circuit and a combining circuit for combining the results of the first and second inverting circuits may be provided to improve noise resistance. Inflection points in the baseband signal are detected to select one output from the first, second inverting circuit and the combining circuit in accordance with detection of the inflection points. In the first and second inverting circuits, a relation between its one input to be controlled and the other input for control may be exchanged.

BRIEF DESCRIPTION OF THE DRAWINGS

The object and features of the present invention will become more readily apparent from the following detailed description taken in conjunction with the accompanying drawings in which:

FIG. 1 is a block diagram of FSK data demodulator of a first embodiment included in an FSK receiver.;

FIGS. 5A to 5D are block diagrams of FSK data demodulators of the second embodiment wherein FIG. 5D is a block diagram of a combining circuit shown in FIG. 5A;

FIGS. 6A to 6H show waveforms obtained in demodulation processing of the FSK data demodulator of the second embodiment;

FIG. 7B is a block diagram of the switching signal generation circuit shown in FIG. 7A;

FIGS. 8A and 8D are block diagrams of signal switching circuits shown in FIG. 7A;

The same or corresponding elements or parts are designated as like references throughout the drawings.

DETAILED DESCRIPTION OF THE INVENTION

Figure 5D:
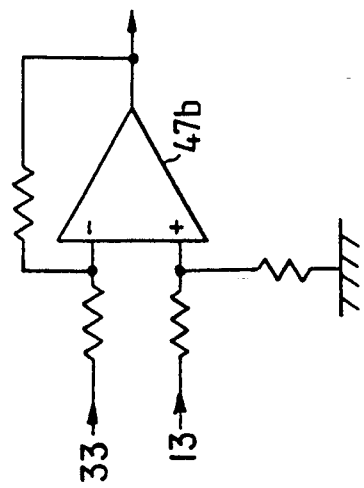

Hereinbelow will be described a first embodiment of this invention with reference to FIGS. 1, 2, 3A to 3D, and 4A to 4F. FIG. 1 is a block diagram of FSK data demodulator of this embodiment included in an FSK receiver. In FIG. 1, numeral 1 is an FSK modulation signal which is received from an antenna 1a and amplified by an amplifier 1b; numeral 2 is a local oscillator; numeral 3 is a ninety-degree phase shifter for shifting phase of an output signal of the local oscillator 2; numeral 4 is a first mixer for mixing the FSK modulation signal 1 with the output signal of the local oscillator 2; numeral 5 is a second mixer for mixing the FSK modulation signal 1 with the output signal of the ninety-degree phase shifter 3, numerals 6 and 7 are first and second low-pass filters for passing baseband I and Q signals from the output signals of the mixers 4 and 5 respectively. The amplifier 1b is of an automatic gain control type in this embodiment. However, an ordinary amplifier without automatic gain control can be used for the amplifier 1b.

The first mixer 4 is supplied with the FSK modulation signal 1 and the output of the local oscillator 2. An output of the mixer 4 is passed through the first low-pass filter to obtain the I signal 8 as the first baseband signal. The second mixer 5 is supplied with the FSK modulation signal 2 and a signal obtained phase-shifting of the output signal of the local oscillator 2 by the first ninety-degree phase shifter 3. An output of the mixer 5 is passed through the second low-pass filter to obtain the Q signal 9 as the second baseband signal. Numeral 10 is a voltage change detection circuit supplied with the I signal 8, which outputs an inverting control signal 11 as a judgement result. Numeral 12 is an inverting circuit with control for inverting a sign of the Q signal 9 in accordance with the inverting control signal 11.

Operation of the FSK data demodulator of the first embodiment will be described.

Assuming the above-mentioned received FSK modulation signal 1 as R(t), it is defined by:

$$R(t) = A \cdot \cos\{(\omega_o + \omega_d \cdot D(t)) \cdot t\} \quad (1)$$

wherein A is an amplitude of the FSK received signal, $\omega_o$ is a carrier frequency, $\omega_d$ is an FSK frequency shift mount, D(t) is a function indicative of binary data transmitted at an instance t, that is, a binary function, wherein it shows +1 when it indicates a marked portion and −1 when it indicates a space.

Moreover, assuming the output of the local oscillator 4 mentioned above as L(t), it is defined as follows:

$$L(t) = \cos\{\omega_o + \Delta\omega) \cdot t + \phi\} \quad (2)$$

wherein $\Delta\omega$ is frequency difference between a carrier and the local oscillator 2, $\phi$ is a phase shift difference between the received FSK signal 1 and the output of the local oscillator 2.

Then, I(t) and Q(t) as the I signal 8 and the Q signal 9 are given as follows:

$$I(t) = (A/2) \cos\{\omega_d \cdot D(t) - \Delta\omega) \cdot t - \phi\}$$

$$Q(t) = (A/2) \sin\{\omega_d \cdot D(t) - \Delta\omega) \cdot t - \phi\} \quad (3)$$

Here, it is assumed for simplification that the frequency difference between the carrier and the local oscillator $\Delta\omega = 0$, the phase difference between the received FSK signal and the output of the local oscillator, $\phi = 0$.

This assumption does not effect the essential operation of the demodulator because this assumption shows an ideal condition in the receiving operation.

In this embodiment, decoding is carried out as follows:

A phase quadrant of the I signal 8 is judged by detection of direction of the voltage change of the I signal 8. Then, the transmitted signal is judged as a marked portion or a space from a relation between the judged phase quadrant and voltage signs of the Q signal. The phase quadrant means a quadrant at which the angle in the cosine term of I (t) lies, assuming the I(t) is represented in the rectangular coordinate.

Each of phase quadrants of the I signal 8 and the voltage changes of the I signal 8 at each of phase quadrants, voltage conditions of a signal phase-shifted by ±90 degree are shown in TABLE. 1

TABLE 1

| phase quadrant of I signal | 0 − π | π − 2 | |
|---|---|---|---|
| voltage change of I signal | decrease | increase | |
| leading signal by 90° from I signal | positive voltage | negative voltage | corresponding to Q signal when transmitted data means marked |
| lag signal by 90° from I signal | negative voltage | positive voltage | corresponding to Q signal when transmitted data means a space |

Therefore, judgement is possible as follows:

(1) when the phase quadrant of the I signal 8 is 0−π, that is, the voltage change of the I signal 8 is decreasing, the transmitted data means a marked portion if the detected voltage of the Q signal is positive, if it is negative, the transmitted data means a space.

(2) when the phase quadrant of the I signal is π−2π, that is, the voltage change of the I signal 8 is increasing, the transmitted data means a marked portion if the detected voltage of the Q signal is negative, if it is negative, the transmitted data means a space.

This judging method is employed in the FSK data demodulator of the first embodiment.

That is, the voltage change detection circuit 10 detects whether the I signal 8 is in increasing or decreasing condition, to produce an inverting control signal 11 as an output signal to be sent to the inverting circuit 12. The inverting circuit 12 for converting the sign of the Q signal in accordance with the inverting control signal 11 inverts the sign of the Q signal when the I signal 8 is in the increasing condition. On the other hand, it outputs the Q signal as it is when the I signal 8 is in the decreasing condition. Therefore, a positive voltage is obtained in the Q signal 9 when the transmitted data means a mark; a negative voltage, when the transmitted data means a space. This provides demodulation of the transmitted data.

On the other hand, the same judgement can be obtained by that the inverting control signal is obtained from the Q signal by the voltage change detection circuit 10 to perform the inverting processing by the inverting circuit 12. For example, in the case that the Q signal 9 is positive when the output of the signal change detection circuit 10 is in the increasing direction of the I signal 8, the voltage change detection circuit 10 produces the output signal with the sign of the voltage inverted. On the other hand, in the case that the Q signal 9 is negative when the I signal 8 is in the decreasing condition, the voltage change detection circuit 10 produces the output signal with the sign of the output voltage non-inverted. Therefore, the output of the inverting circuit 13 produces a positive voltage when the transmitted data means a mark portion and the output of the inverting circuit 13 produces a negative voltage when the transmitted data means a space.

Here, will be described effect to the demodulated data by the frequency difference $\Delta\omega$ between the carrier and the local oscillator 2 and the phase difference $\phi$ between the received FSK modulation signal 1 and the output of the local oscillator 2 mentioned above. The decode process mentioned above utilize the quadrature relation between the I and Q signals 8 and 9. Therefore, the decoding is possible in the theoretical meaning while the quadrature relation between the I and Q signals is kept.

When the frequency difference between the carrier and the local oscillator 2 $\Delta\omega \neq 0$, the frequencies of the I signal 8 and the Q signal 9 are changed in accordance with the transmitted data, namely, changed between $\omega d + \Delta\omega$ when marking and $\omega d - \Delta\omega$ when spacing. However, the both frequencies of the I and Q signals change at the same time and the quadrature relation is kept, so that there is no effect to the demodulated data. Therefore, when $\omega d > \Delta\omega$ and $\Delta\omega$ lies in the range that the change of the signal of frequency $\omega d - \Delta\omega$ can be detected, decrease in sensibility due to the frequency deviation between the local oscillator 2 and the carrier is kept low in the receiver having this demodulator.

When the phase difference between the received FSK modulation signal and the output of the local oscillator $\phi \neq 0$, there is no effect to the demodulation result because the term $\phi$ is included in the both of equation I(t) and Q(t) in the same manner, so that there is no effect to quadrature relation therebetween.

Hereinbelow will be described structure of the voltage change detection circuit 10 and the inverting circuit with control 12 and operation with reference to FIGS. 2 and 4A to 4F.

Figure 2:
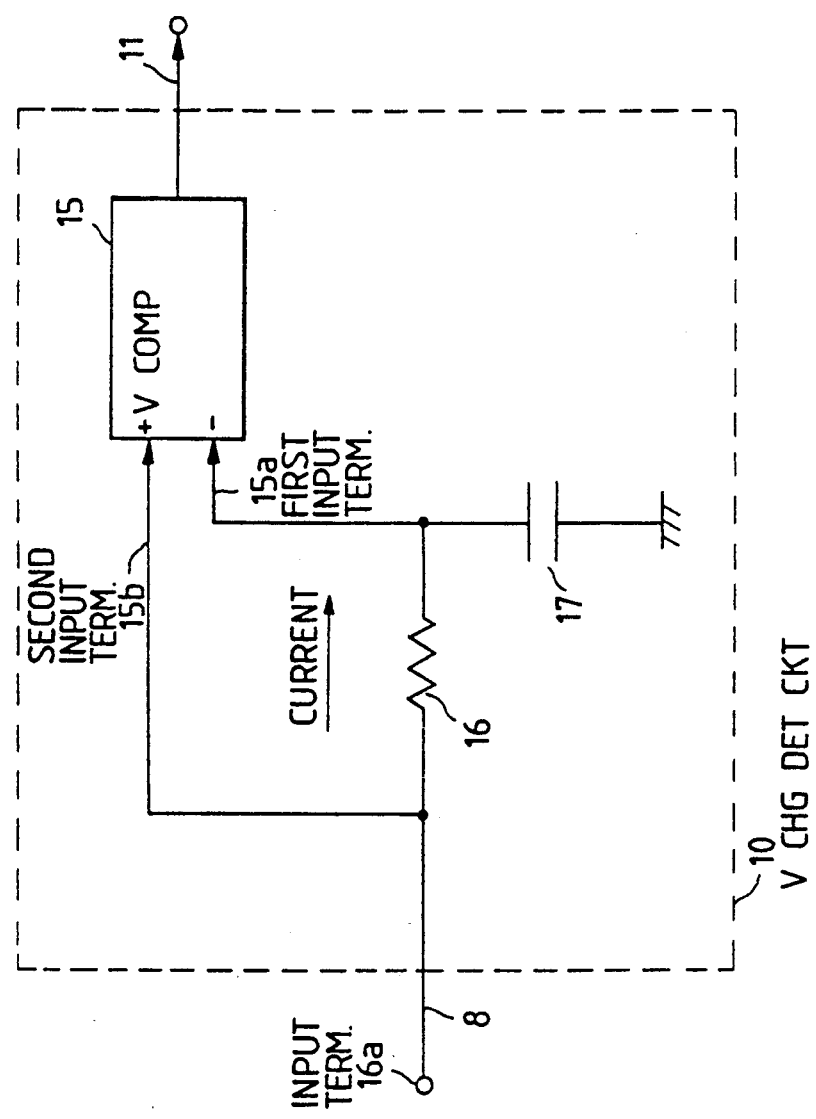
FIG. 2 shows an example of the voltage change detection circuit of this invention.

FIG. 2 shows an example of the voltage change detection circuit 10.

Structure of the voltage change detection circuit 10 will be described with reference to FIG. 2. The voltage change detection circuit 10 detects the presence of increase and decrease when the voltage inputted to its input terminal 16a. It outputs a positive voltage signal when the voltage of the input terminal increases, a negative voltage signal, when the voltage decreases. It comprises a voltage comparator 15 for detecting the change in voltage, a capacitor 17 connected between the first input terminal and the ground, for maintaining the reference voltage and a resistor 16 connected between the second input terminal 15b and the first input terminal 15a of the operational amplifier 15, for detecting a current, the second input terminal of the operational amplifier 18 receiving the input signal.

Operation of the voltage change detection circuit 10 in the embodiment will be described.

When the voltage of the input terminal is higher than the voltage stored in the capacitor 17 for maintaining the reference voltage, a current flows through the resistor 15 in the direction denoted by the arrow shown in the drawing and it is stored in the capacitor 17. The voltage comparator 18 outputs a positive voltage due to a voltage drop across the resistor 16 caused by the flow of the current. On the other hand, when the voltage of the input terminal 15 is lower than the voltage stored in the capacitor 17, the voltage comparator 15 outputs a negative voltage in the similar process. Therefore, if the input voltage is simply increasing, the positive value of voltage is outputted and when it is simply decreasing, the negative value is outputted. Moreover, the voltage change direction of the baseband signal within a very short interval can be detected by setting the time constant of the resistor 16 and the capacitor 17 to a very small value. In the operation of this structure, the output of the detection result is performed by the positive and the negative voltages. However, there is not necessary to limit to the binary of the positive and the negative values as the detection result. For example, it is obvious that a digital signal including 0 and 1 can transfer the result.

FIGS. 3A to 3D are block diagrams of examples of the inverting circuits with control 12a to 12d for the inverting circuit 12 of the invention.

The inverting circuit 12 controls the sign of the Q signal 9 in accordance with the binary control signal of the output signal 11 of the voltage detection circuit 10. The output of the voltage change detection circuit 10 mentioned above is connected to the input 11 of the inverting circuit 12. The control signal to the inverting circuit 12 depends on the voltage change detection circuit 10. Here, description is made assuming that the output of the voltage change detection circuit 10 having the structure mentioned above is connected to a control signal input terminal of the inverting circuit 12. That is, the control signal input terminal of the inverting circuit 12 is supplied with a binary of positive and negative values.

Here, the input signal to the inverting circuit 12 to be controlled is assumed that it shows binary values of conditions A and B. When a positive voltage is applied to the control signal, that is, when the voltage change detection circuit 10 detects increase in the input voltage, the input signal to be controlled is outputted at the output terminal 13 with its condition unchanged. When the a negative voltage is applied to the control signal, that is, when the voltage change detection circuit 10 detects decrease in the input voltage, when the input signal to be controlled is in the condition A, it is converted to the condition B, when it is in the condition A, it is converted to the condition B. In the inverting circuit 12, a relation between its one input to be controlled and the other input for control may be exchanged.

Operation of the inverting circuit 12 of this embodiment will be described with reference to FIGS. 3A to 3D. The input signal of the inverting circuit 12 of this embodiment shows binary of positive and negative voltage values. Therefore, the circuit should be structured such that when the negative voltage is inputted to the control input terminal, the input signal is outputted as the positive or negative voltage. When the positive voltage is applied to the control input terminal, the input signal is outputted with the sign of the input signal inverted. Here, an example of structure of the inverting circuit 12 outputs a digital binary signal.

If the inverting circuit 12a is used as the inverting circuit 12, the Q signal 9 is divided into two. One is fed to an inverting circuit 18 and the other is inputted to a switch circuit 19 as it is. The switch circuit 19 operates in response to the output signal of the voltage change detection circuit 10. The switch circuit 19 outputs the Q signal 9 when the output voltage of the voltage change detection circuit 10 is lower than the reference voltage and outputs the inverting circuit 18 when the output voltage of the voltage change detection circuit 10 is higher than the reference voltage.

The amplitude limitation amplifier 21 limits amplitude of the output of the switch circuit 19 to produce a binary signal having positive and negative voltages with their amplitude limited. Because the amplitude limitation amplifier 21 is used for converting the output signal to the digital signal, the same effect can be obtained by amplitude-limiting of the input signal 9 in advance.

Figure 3A:
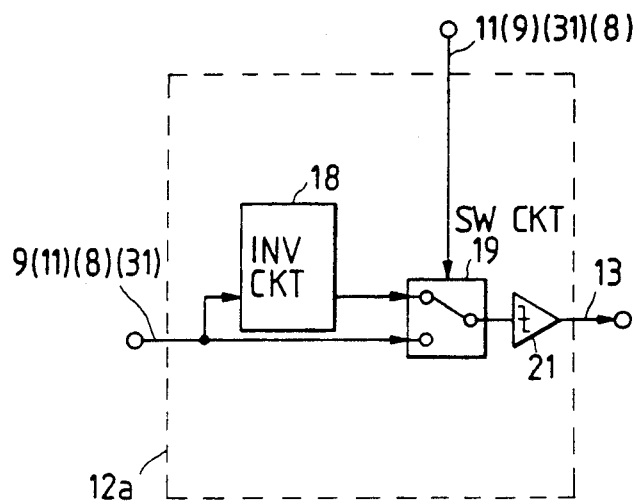
FIGS. 3A to 3D are block diagrams of examples of the inverting circuits with control of the invention.
Figure 3B:
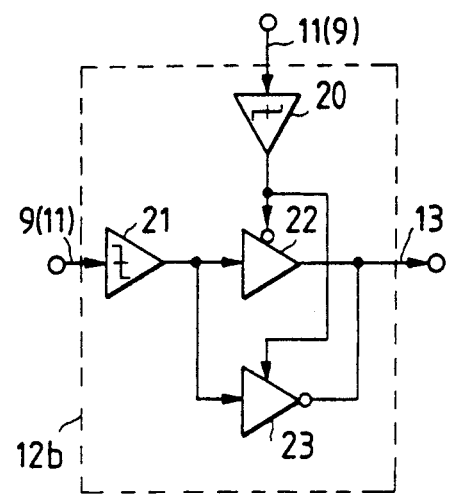

If the inverting circuit 12b shown in FIG. 3B is used as the inverting circuit 12, the Q signal 9 applied to the input terminal is converted into a digital binary signal by the amplitude limitation amplifier 21 and its output is sent to the three-state buffer 22 and the three-state inverter 23. Then, either of the three-state buffer 22 or the three-state inverter 23 is selected to output its output signal in response to a binary digital signal obtained from the control signal 11 passed through the amplitude limitation amplifier 20.

Figure 3C:
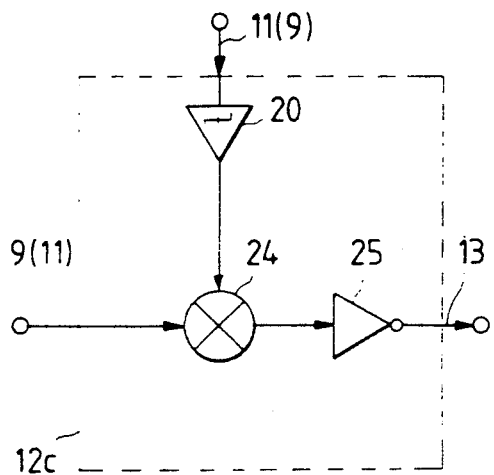

If the inverting circuit 12c shown in FIG. 3C is used as the inverting circuit 12. The Q signal 9 is mixed with the signal obtained from the control sign 11 whose positive and negative amplitudes are limited by the amplitude limiting amplifier 20. Therefore, the Q signal having positive and negative voltages is outputted by the mixer 24 as it is when the control signal 11 is negative. When the control signal 11 is positive the Q signal is outputted by the mixer 24 with sign inverted. This provides judgement of the transmitted data. However, the sign of the output voltage has a different sign from the circuit examples of inverting circuits 12a, 12b, and 12d, so that a sign inverting circuit 25 is provided to invert the output of the mixer 24. This provides same operation result of the other inverting circuits 12a, 12b, and 12d. Here, the example where the sign inverting circuit 25 is connected to the output of the mixer 24. However, it is obvious that the sign inverting circuit 25 can be located at the input side of the mixer 24 to provide the same result.

Figure 3D:
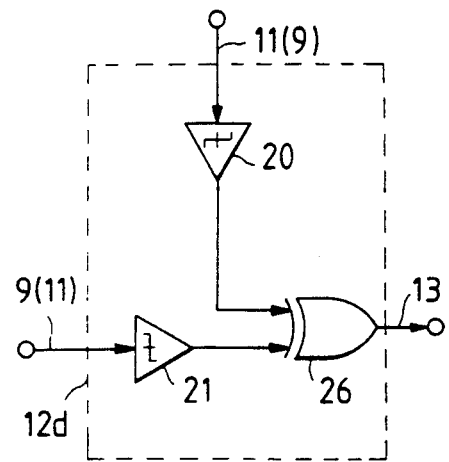

If the inverting circuit 12d shown in FIG. 3D is used as the inverting circuit 12. The Q signal 9 applied to the input terminal is converted into a binary digital signal by the amplitude limiting amplifier 21 is supplied to an Exclusive OR circuit 26 whose the other input is supplied with a digital signal converted from the control signal 11 by the amplitude limiting amplifier 20. When the Exclusive OR circuit is supplied with 'H' at the one input, it outputs a signal obtained by inverting the signal input to the other terminal. When the Exclusive OR 26 is supplied with 'L', it outputs the signal inputted to the other input terminal with the level unchanged. Therefore, this circuit performs the same operation as the inverting circuits 12a to 12c mentioned above.

As the example of the decoding process, will be described operation of the FSK data demodulator using the circuit shown in FIG. 2 for the voltage change detection circuit 10 wherein the operational amplifier is used as the voltage comparator 15 whose the first and second input terminals are minus and plus input terminals, and the circuit shown in FIG. 3D for the inverting circuit 12 with reference to FIGS. 4A to 4F. FIGS. 4A to 4F show waveforms at respect points of the demodulator mentioned above.

Figure 4A:
FIGS. 4A to 4F show waveforms at respect points of the demodulator of the first embodiment.
Figure 4B:
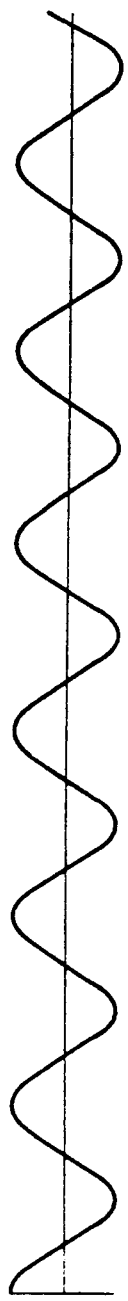
Figure 4C:
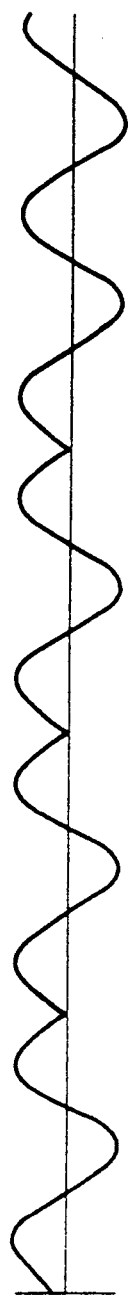
Figure 4D:
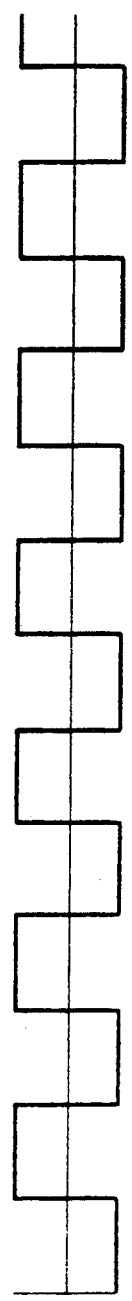
Figure 4E:
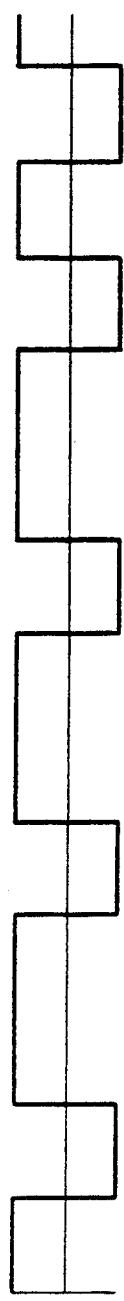

At first, it is assumed that the I signal 8 having waveforms shown in FIG. 4B and the Q signal 9 having waveforms shown in FIG. 4C are obtained at the outputs of the low-pass filters 6 and 7 respectively. That is, the I signal 8 and the Q signal 9 have a quadrature relation with each other and in addition to this, either of them is subject to frequency shift from the carrier frequency of the frequency shift keying (FSK) signal in accordance with upper and lower portions of the waveform of baseband signal for modulating, as shown in FIG. 4A.

As shown in FIG. 1, in this circuit, the I and Q signals are supplied to the voltage change detection circuit 10 and to the amplitude limiting amplifier 21 of the inverting circuit 12d as the inverting circuit 12.

The output 11 of the voltage change detection circuit 10 mentioned above is converted into a binary signal by the amplitude limiting amplifier 20 in the inverting circuit 12d.

Figure 4F:

The binary output of the amplitude limiting amplifier 20 and the binary output of the amplitude limiting amplifier 21 are supplied to the Exclusive OR circuit 26 which outputs the decoding result, that is, demodulated and decoded baseband signal as shown in FIG. 4F.

As mentioned above, the decoded data according this method is not subjected to affection due to the frequency difference between the local oscillator 2 and the carrier, so that accurate decoding is possible though the local oscillator 2 has a low accuracy in the oscillation frequency. Moreover, it is also prevented that the receiving sensitivity decreases due to the frequency deviation the local oscillator 2 and the carrier.

Figure 10:
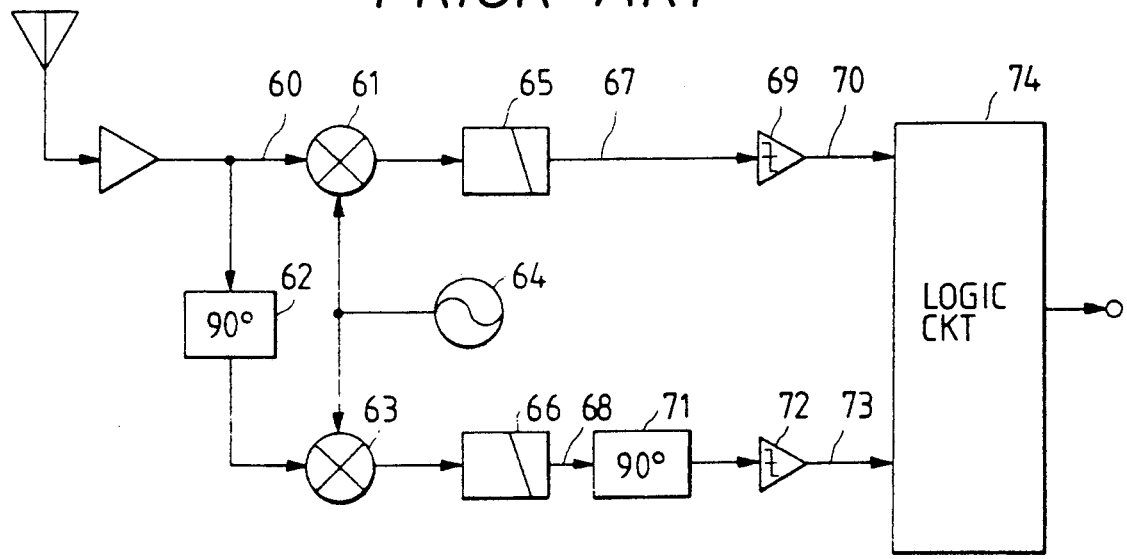
FIG. 10 is a block diagram of a prior art FSK data demodulator.

In the case of the high speed data transmission, the maximum value of the symbol rate of the transmitted data in this decoding process is determined by the minimum detection amount of the voltage change detection circuit 10 with respect to the change with time of the I signal 8. Therefore, this eliminates the necessity of detection of the voltage change of the signal necessary in the processing of phase shifting. Thus, it is enough to discriminate the presence of the increase or decrease of the signal voltage. Therefore, a high sensitive FSK demodulator can be obtained with a simple structure. In addition, in the symbol rate of the transmission data in the decoding process, there is no limitation theoretically. In fact, the symbol rate is limited only by the sensitivity of the voltage change detection circuit 10, so that an extremely high speed data communication is possible compared with the prior art demodulator using a ninety-degree phase shifter as shown in FIG. 10. However, because the decoding is performed by detection of the voltage change of the signal, if there is a possibility of overload of the received radio wave, an automatic gain control circuit should be provided before the mixers 4 and 5 mentioned above to prevent distortion of the waveform of the baseband signal.

In addition, it is possible to form the inverting circuit 12 with digital operation circuits as shown in FIGS. 3A, 3B, and 3D. Generally, because the digital operational devices are suited for implementation of the integrated circuit compared with the analog hybrid operation devices it is easy to provide an integrated circuit of the decoding processing circuit in which the decoding processing is performed by digital processing with the circuit mentioned above. The system can be constructed with small size with low power consumption by the implementation of circuits in the integrated circuit.

Hereinbelow will be described a second embodiment of this invention with reference to FIGS. 5A to 5C, and FIGS. 6A to 6H.

Figure 5A:
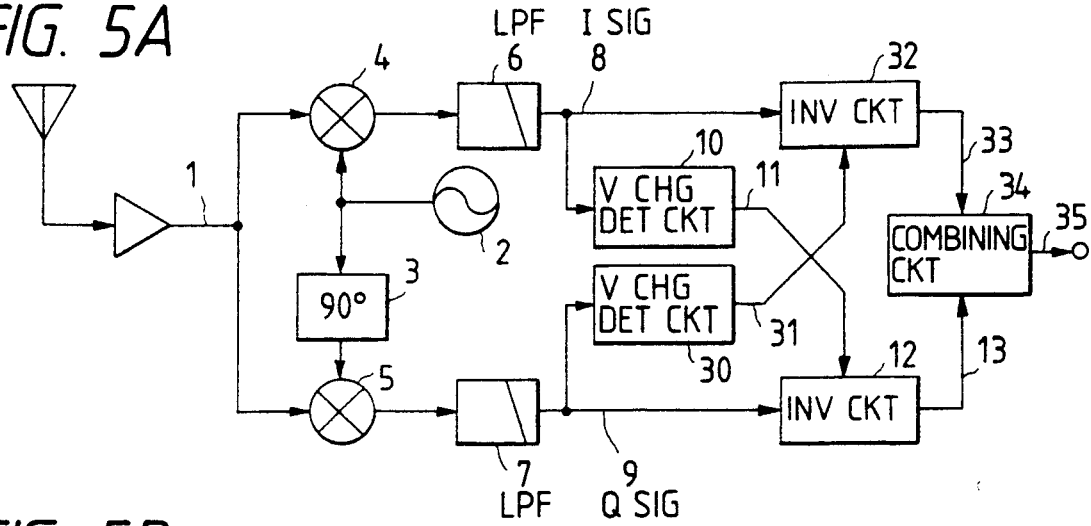
Figure 5B:
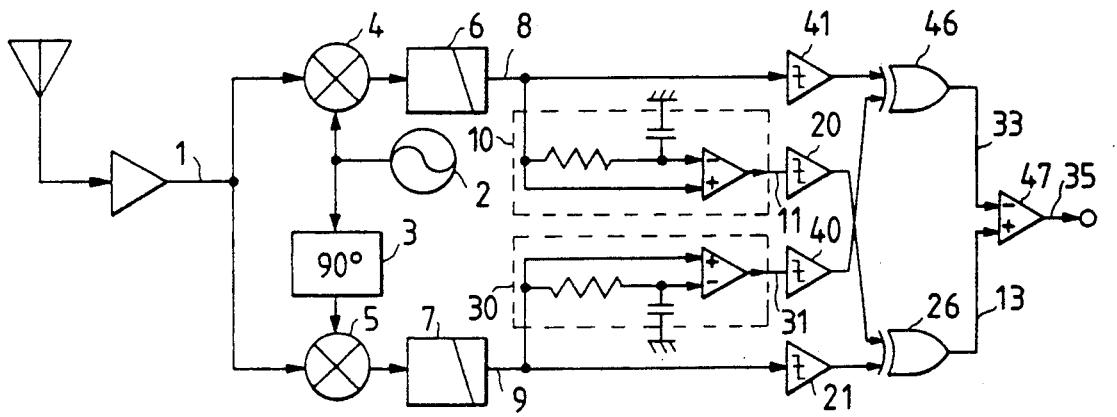
Figure 5C:
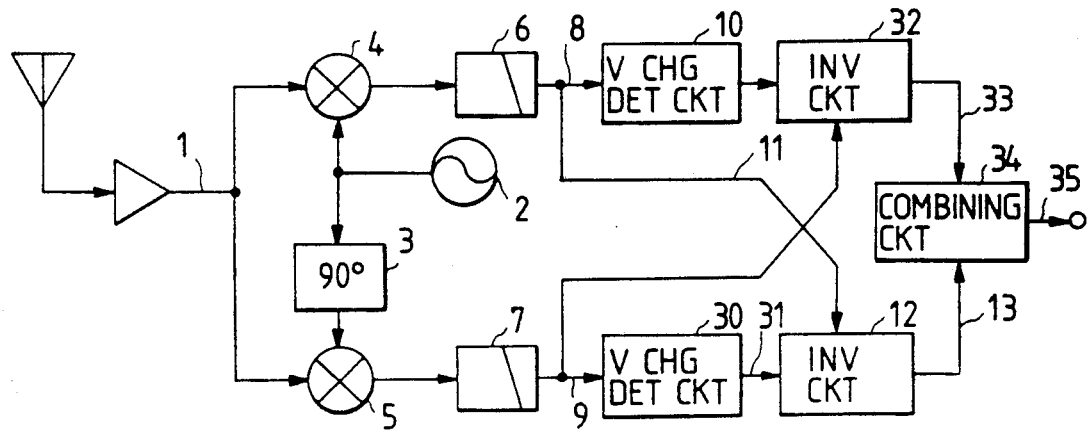

FIGS. 5A to 5C are block diagrams of FSK data demodulator of the second embodiment and FIG. 5D is a schematic diagram of a combining circuit shown in FIGS. 5A and 5C. FIGS. 6A to 6H show waveforms obtained in demodulation processing of the FSK data demodulator of the second embodiment.

In FIG. 5A, numeral 1 is an FSK modulation signal; numeral 2 is a signal source as a local oscillator; numeral 3 is a first ninety-degree phase shifter; numerals 4 and 5 are first and second mixers; numerals 6 and 7 are first and second low-pass filters. Numerals 8 and 9 are I and Q signals. Numeral 10 is a first voltage change detection circuit supplied with the I signal 8 and outputs an inverting control signal 11 as a judgement result. Numeral 12 is an inverting circuit for inverting a sign of the Q signal 9 in accordance with the inverting control signal 11 to obtain the first decoding result 13.

The structure of the second embodiment is the same as that of the first embodiment shown in FIG. 1 except that decoding process. The decoding process of the first embodiment was done by only inverting the sign of the Q signal 9 in accordance with increase in the voltage of the I signal 8. However, the decoding process is carried out by inverting signs of the I and Q signals 8 and 9 at the same time. The inverting of the sign of the I signal 8 is done in accordance with increase or decrease in the voltage of the Q signal 9 to produce a second decoding result 33. The inverting of the sign of the Q signal 9 is done in accordance with increase or decrease in the voltage of the I signal 8 as similar to the first embodiment to produce a first decoding result 13. A final decoding result 35 is obtained in accordance with both decoding results 13 and 33. This improves noise resistivity by the redundancy in the circuit structure of the second embodiment.

That is, numeral 30 is a second voltage change detection circuit, to which the I signal 9 is inputted, for outputting an inverting control signal 31 as the first judging result. Numeral 32 is a second inverting circuit for inverting a sign of the I signal 8 in response to the inverting control signal 31 to obtain a second decode result 33. Numeral 34 is a signal combining circuit obtaining a final decoding result 35 by combining the first and second decoding results 13 and 33.

Hereinbelow will be described operation with respective elements having concrete structures as an example as similar to the first embodiment. That is, it is assumed that as the voltage change detection circuit, the circuit shown in FIG. 2 is used; as the inverting circuit 12, the inverting circuit 12d shown in FIG. 3D is used; and as the combining circuit 34, an operational amplifier 47 is used.

In FIG. 5B, numerals 20, 21, 40, and 41 are first to fourth amplitude limiting amplifiers. Numerals 26 and 46 are first and second Exclusive OR circuits.

A decoding operation will now be described.

At first, transmitted data is assumed as shown in FIG. 6A. The final decode result 35 is obtained in the similar process to the first embodiment as follows:

As shown in FIG. 6D, a first decode result 13 is obtained by the Exclusive OR circuit 26 which performs binary combining operation between a binary signal shown in FIG. 6B, obtained by binary-digitizing the output 11 of the voltage change detection circuit 10 by the amplitude limiting amplifier 20 and a binary signal shown in FIG. 6C, obtained by binary-digitizing the Q signal 9 by the amplitude limiting amplifier 21. As shown in FIG. 6G, the second decoding result 33 can be similarly obtained because the I signal 8 and the Q signal 9 are symmetrical with each other, by the Exclusive OR circuit 46 which performs combining operation between a binary signal shown in FIG. 6E, obtained by binary-digitizing the output 31 of the voltage change detection circuit 30 to which the Q signal is inputted by the amplitude limiting amplifier 40 and a binary signal shown in FIG. 6F, obtained by binary-digitizing the I signal 8 by the amplitude limiting amplifier 41. However, the sign of the decoding results are different from each other because the I and Q signals have a quadrature relation. Then, the final result 35 is obtained as shown in FIG. 6H by obtaining a difference between the decode results 13 and 33 by the operational amplifier 47 as the signal combining circuit 34. Here, consider the decoding results 13 and 33. They have an antiphase relation with each other. Therefore, an advantage effect of cancelling in-phase noise components is developed in the respective processing.

In the first and second embodiments, explanation was done such that decoding is carried out by inverting the sign of the I and Q signals in response to the inverting control signal from the voltage detection circuits 10 and 30. However, as described in the first embodiment (see TABLE 1), the output signals of the voltage change detection circuits 10 and 30 can be treated similarly to the binary signals of I and Q signals 8 and 9. Therefore, as shown in FIG. 5C, a similar decoding result can be obtained such that the output signals of the voltage change detection circuits 10 and 30 of the Q and I signals are inputted to the inverting circuits 32 and 12 respectively and the I and Q signals 8 and 9 are used as the inverting control signals. This structure provides the same result as that shown in the FSK data demodulator shown in FIG. 5A. The combining circuit 34 may comprises a voltage summing circuit using an operational amplifier 47b employing inverting operation as shown in FIG. 5D.

Hereinbelow will be described a third embodiment of this invention with reference to FIGS. 7A, 7B, 8A to 8D, and 9.

Figure 7A:
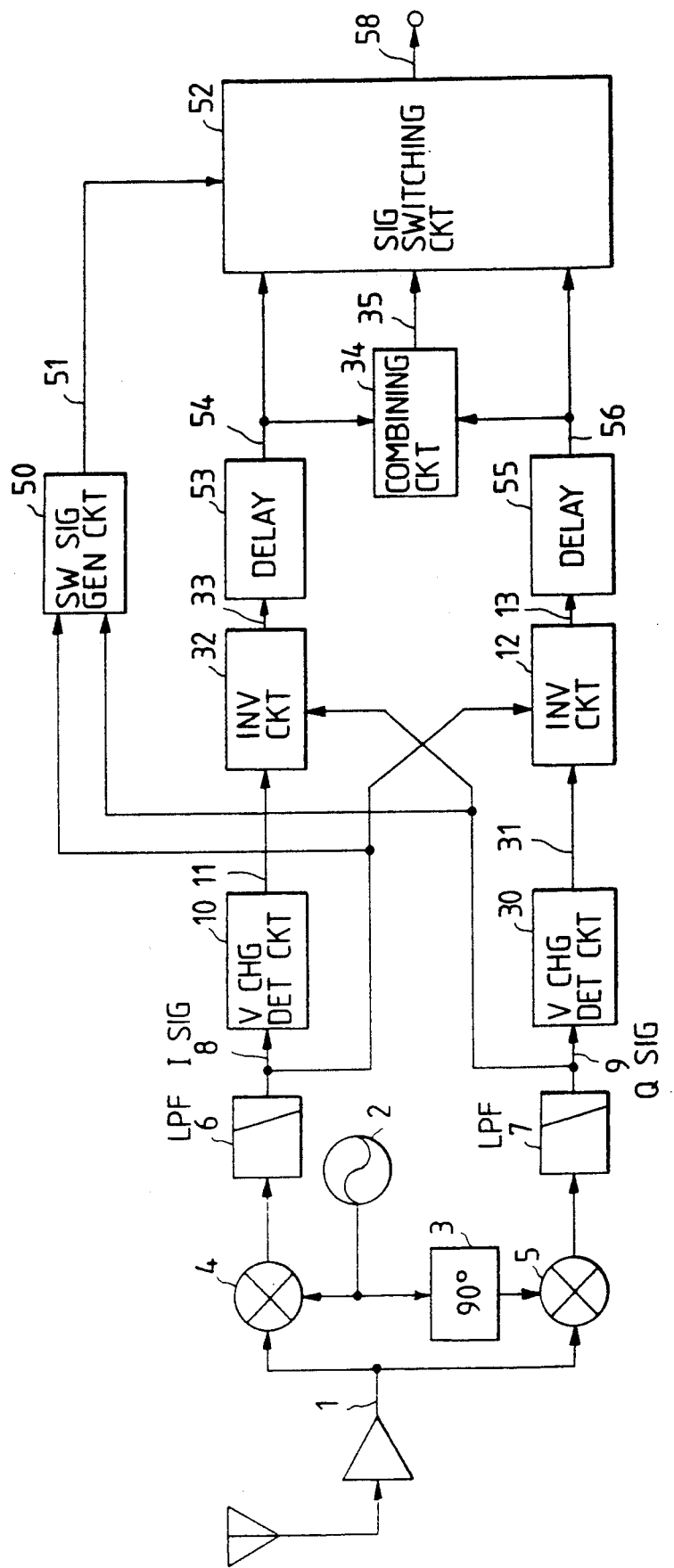
FIG. 7A is a block diagram of an FSK data demodulator of the third embodiment.
Figure 9:
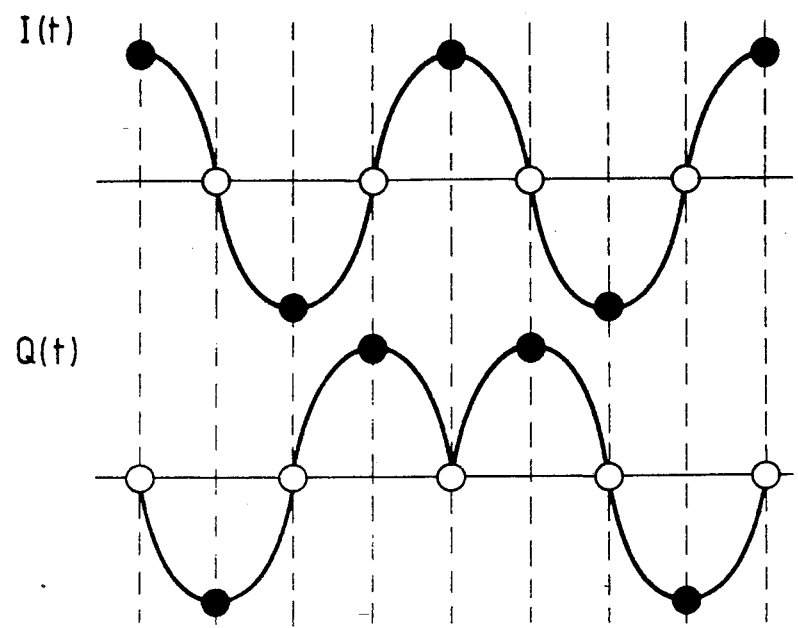
FIG. 9 is an explanatory drawing showing a principle in demodulation processing of the demodulator of the third embodiment.

FIG. 7A is a block diagram of an FSK data demodulator of the third embodiment. FIG. 9 is an explanatory drawing showing a principle in demodulation processing of the demodulator of this embodiment.

In FIG. 7A, numeral 1 is an FSK modulation signal; numeral 2 is a signal source as a local oscillator; numeral 3 is a first ninety-degree phase shifter; numerals 4 and 5 are first and second mixers; numerals 6 and 7 are first and second low-pass filters. Numerals 8 and 9 are I and Q signals obtained by the structure just mentioned above. Numeral 10 is a first voltage change detection circuit supplied with the I signal 8 and outputs an inverting control signal 11 as a first judgement result. Numeral 30 is a second voltage change detection circuit supplied with the Q signal 9 and outputs a signal 31 as a second judgement result. Numeral 12 is an inverting circuit for inverting a sign of the I signal 8 in accordance with the inverting control signal 31 to obtain the first decoding result 13. Numeral 32 is a second inverting circuit for inverting a sign of the Q signal 9 in accordance with the inverting control signal 11 to obtain the second decoding result 33. Numeral 34 is a combining circuit for combing the first and second decoding results 13 and 33 to obtain a decode result 35.

This structure is the same as that shown in FIG. 5C except that decoding is performed by selectively use a signal near the zero-crossing point of the I and Q signals 8 and 9. This provides improvement of noise resistivity by previously removing portions of waveforms showing little change in the signal level, which tends to develop noise error.

That is, there is provided a switching signal generation circuit 50 to which the I signal 8 and the Q signal 9 are inputted, for detecting inflection points of these signals to produce a detection signal 51 after a predetermined interval has passed from the detection. The detection signal 51 includes discrimination information between the detection channel to be selected. Moreover, there is provided a signal switching circuit 52; for selecting an output signal 54 of the delay circuit 53 when the detection signal 51 indicates the presence of the inflection point in the I signal 8; for selecting an output signal 56 of the delay circuit 55 when the detection signal 51 indicates the presence of the inflection point of the Q signal 9; and for selecting an output signal 35 of the signal combining circuit 34 when the detection signal 51 indicates no detection of the inflection point, so that the demodulated output signal 58 is obtained finally.

Figure 8A:
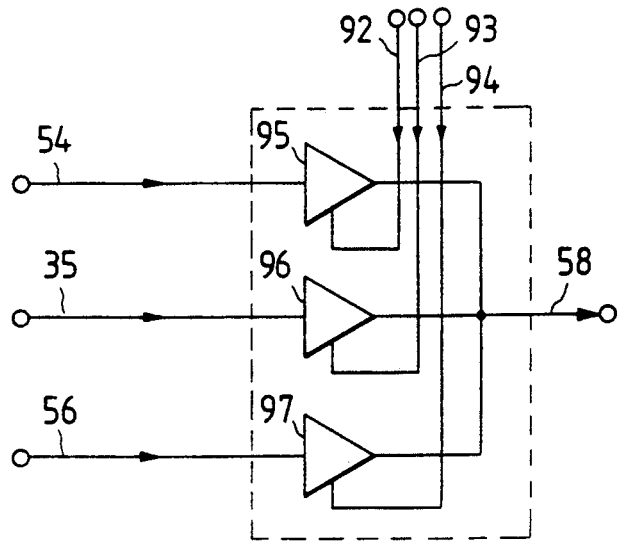
Figure 8B:
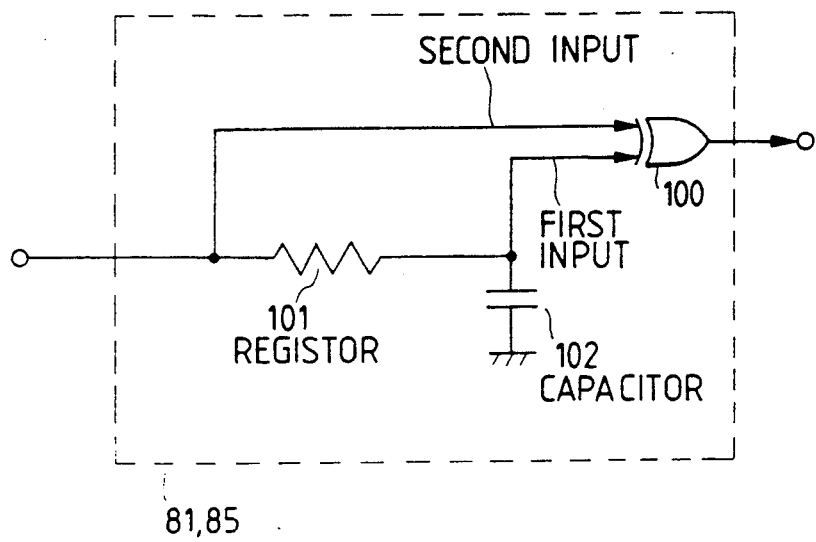
FIGS. 8B and 8C are block diagrams of edge detection circuits shown in FIG. 7B.

Here, as similar to the second embodiment, will be described the operation of the demodulator of this embodiment using the circuit shown in FIG. 2 for the voltage change detection circuits 10 and 30, and the operational amplifier as the voltage comparator of the voltage change detection circuits 10 and 30, whose first and second input terminals are used for minus and plus input terminals, and the inverting circuit 12d shown in FIG. 3D for the signal control inverting circuits 12 and 32, an operational amplifier is used for a signal combining circuit 34, a circuit shown in FIG. 7B is used for the switching signal generation circuit 50, and a circuit shown in FIG. 8A is used for the signal switching circuit 52, and a circuit shown in FIG. 8B is used for an edge detection circuit 81 and 85 used in the switching signal generation circuit 50. FIG. 8D is a block diagram showing a signal switching circuit 52 using analog switches 195 to 197.

At first, selection operation of the baseband signals will be described with reference to FIG. 9. It is assumed that waveforms I(t) and Q(t) are inputted as the baseband signals as shown in FIG. 9. It is difficult to detect a voltage difference around the inflection points of the I and Q signals of baseband, which are denoted with dots because inclination becomes to zero there. On the other hand, it is easy to detect a voltage difference around zero-crossing points denoted with circuits because inclination is maximum. Particularly, when the modulation index of the FSK is low the output signal of the voltage change detection circuit 10 shown in FIG. 2 will decrease because change per one symbol interval in the I and Q signals 8 and 9 of the baseband is low, so that there is the possibility of error in the detection result.

Here, because baseband I and baseband Q signals 8 and 9 have a phase difference of 90 degrees, at an inflection point of one baseband signal the inclination of the other baseband signal is maximum. In the demodulation of this system, demodulation is possible using inclination of one baseband signal of the baseband I and baseband Q signals 8 and 9 and a sign of the other baseband signal. Therefore, at the inflection points denoted with dots as shown in FIG. 9, there is provided demodulation using only the sign of one baseband signal and the inclination of the other baseband signal. This provides improvement of demodulation capability because demodulation is performed without unreliable information of inclination of the baseband signal by selecting one baseband siganl in accordance with the condition of the signal.

In the following embodiment, detection of inflection points of I and Q signals 8 and 9 are carried out by detection of the zero-crossing points each other. However, it is obvious that another detection method is effective.

At first, operation of the switching signal generation circuit 50 shown in FIG. 7B will be described.

Numerals 80 and 84 are amplitude limiting amplifier for binary-digitizing the I and Q signals 8 and 9. Numeral 81 and 85 are edge detection circuits for detecting the change of sign of the input signals. Numeral 82 and 86 are one shot trigger pulse generation circuits. Numeral 88 is an Exclusive OR circuit. Numerals 89 and 90 are OR circuits. Numeral 91 is an inverting circuit.

As shown in FIG. 8B, each of the edge detection circuits 81 and 85 comprises an Exclusive OR circuit 100, a capacitor 102 connected between a first input terminal of the Exclusive OR circuit 100 and the ground for maintaining a voltage, and a resistor 101 connected between the first and second input terminals for voltage drop detection, the second input terminal being used for an input terminal of the edge detection circuit, an output terminal of the Exclusive OR 100 being used for an output terminal of the edge detection circuits 81 or 85. Moreover, when a signal voltage at the input terminals of each of the edge detection circuits 81 and 85 changes, a voltage difference between the capacitor 102 causes a current flowing through the resistor 101, so that a voltage difference across the resistor 101 is developed while the capacitor is discharged. The Exclusive OR circuit 100 generates an output signal only when there is voltage difference between the input terminals, so that if there is change in the input signals of the edge detection circuits 81 and 85, they can detect the voltage difference.

Figure 8C:
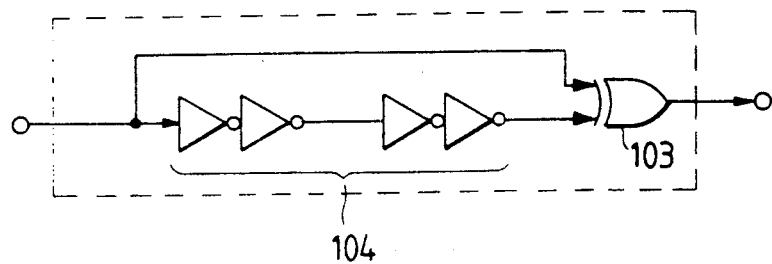

Moreover, because the structure of the edge detection circuits 81 and 85 shown in FIG. 8B can be considered as the structure comprising the Exclusive OR 100 and a delay circuit using CR, the edge detection circuit can be constructed using an Exclusive OR circuit 103 and a delay circuit comprising an even number of inverter circuits 104 as shown in FIG. 8C.

In the structure mentioned above, the I signal 8 of the input signal is binary-digitized by the amplitude limiting amplifier 80. Then, change points of an output of the amplitude limiting amplifier 80 are detected by the edge detector 81, and generates a pulse signal 83 having a predetermined interval T shorter than one fourth of a period of the baseband signal by the one shot trigger pulse generation circuit 82. The I and Q baseband signals 8 and 9 have a quadrature relation therebetween, so that the signal 83 is used as a detection signal of inflection points of the Q signal 9. The Q signal 9 is binary-digitized by the amplitude limiting amplifier 84 similarly and it is passed through the edge detector 85. Then, a pulse signal 87 is obtained by the one shot trigger pulse generation circuit 86. The signal 87 is a inflection point detection signal of the I signal 8.

The Exclusive OR circuit 88 provides a positive output only when signs of the signals 83 and 87 differ from each other. Therefore, when the signal 83 is positive and the signal 87 is negative, an output 92 of the OR circuit 89 is positive because the output of the Exclusive OR is positive. At this instance, the other signals 93 and 94 are negative.

Moreover, when the signal 87 is positive and the signal 83 is negative, an output of the OR circuit 90 is positive and the other signals 92 and 94 are negative.

Here, because the output of the Exclusive OR circuit 88 is negative when the signals 83 and 87 have the same sign, an output of the inverting circuit 91 is positive. Further, the signals 92 and 94 are negative because one input terminal of the OR circuits 89 and 90 are negative.

The relation mentioned above is shown in TABLE 2.

TABLE 2

| signal 83 inflection point of Q signal | signal 87 inflection point of I signal | signal 92 | signal 93 | signal 94 |
|---|---|---|---|---|
| H | H | L | H | L |
| H | L | H | L | L |
| L | H | L | L | H |
| L | L | L | H | L |

That is, when an inflection point is detected in the Q signal 9, the sign of the signal 92 is positive and when an inflection point is detected in the I signal 8, the sign of the signal 94 is positive. The sign of the signal 93 is positive when there is no inflection point in the I and Q signals 8 and 9 because the I and Q signals 8 and 9 have the quadrature relation, so that their inflection points cannot be detected at the same time. Therefore, the signal 92 is indicative of detection of the inflection point of the Q signal 9. The signal 94 is indicative of detection of the inflection point of the I signal 8. The signal 93 is indicative of no detection of the inflection point in both of Q and I signals 8 and 9.

Here, detection of the inflection point of the base band signals enables excluding the demodulated data around the inflection point. The switching of the baseband signals in accordance with the inflection point detection signal is not effective to data before an inflection point because the switching is effected after the inflection point.

Here, in order to perform the switching before and after an inflection point, judgement of the inflection point is performed before the change of the baseband signal by switching of the delayed baseband signals in response to the inflection point. This enables switching the baseband signals before and after the inflection point. Thus, delay circuit 53 and 55 are provided for the I and Q baseband signals 8 and 9. The delay time is about a half of the pulse T mentioned above. This provides an inflection detection signal of the baseband signal developed during an interval from T/2 before the inflection point to T/2 after the inflection point.

The signal switching circuit 52 having the structure as shown in FIG. 8A selects three-state circuits 95, 96, or 97 to which signals 92, 93, and 94 are inputted as control inputs.

That is, in the switching generation circuit 50, when the inflection point is detected in the I signal 8, the signal 51 is supplied to the switching circuit 52 to cause it to select the signal 56 which is obtained by delaying the demodulation result 13 by the interval T/2 by the delay circuit 55, the demodulation result 13 being obtained from the sign of the I signal 8 and inclination information 31 of the Q signal. That is, the signal 94 in the circuit in FIG. 7B is supplied to the switching circuit 52. The switching circuit 52 outputs the signal 56 as a demodulation signal 58 by the three-state circuit 97.

Similarly, in the switching generation circuit 50, when the inflection point is detected in the Q signal 9, the signal 51 is supplied to the switching circuit 52 to cause it to select the signal 54 which is obtained by delaying the demodulation result 33 by the interval T/2 by the delay circuit 53, the demodulation result 33 being obtained from the sign of the Q signal 9 and inclination information 11 of the I signal 8. That is, the signal 92 in the circuit in FIG. 7B is supplied to the switching circuit 52. The switching circuit 52 outputs the signal 54 as a demodulation signal 58 by the three-state circuit 95.

In the switching signal generation circuit 50, when no inflection point is detected, the signal 51 is supplied to the signal switching circuit 52 to select the output 35 of the signal combining circuit 34. That is, the signal switching circuit 52 outputs the signal 35 as the demodulation signal 58.

It is prevented that the demodulation data deteriorates due to malfunction of the voltage change detection circuits 10 and 30 by excluding the demodulation result of the baseband signal around the inflection point where the operation of the voltage change detection circuits 10 and 30 are unstable.

In the first, second, and third embodiments, explanation was done such that decoding is carried out by inverting the sign of the I and Q signals in response to the inverting control signal from the voltage detection circuits 10 and 30. However, as described in the first embodiment(see TABLE 1), the output signals of the voltage change detection circuits 10 and 30 can be treated similarly to the binary signals of I and Q signals 8 and 9. Therefore, as shown in FIG. 5C, a similar decoding result can be obtained such that the output signals of the voltage change detection circuits 10 and 30 of the Q and I signals are inputted to the inverting circuits 32 and 12 respectively and the I and Q signals 8 and 9 are used as the inverting control signals. This structure provides the same result as that shown in the FSK data demodulator shown in FIG. 5A.

There were proposed demodulating systems similar to this invention, that a 90 degree phase shifter or a differentiator in place with the voltage change detection circuit and a mixture is used in place with the signal control inverting circuit. However, in these systems, demodulating is performed by obtained phase information from a voltage change of the signal phase input signal. Therefore, it is necessary to detect the detection of increase or decrease of the signal phase input signal and the amount of increase or decrease of it. However, in the demodulating system of this invention, it is not necessary to obtain phase information of waveforms and demodulation is performed by only detecting whether voltage change is in direction of increase or decrease of the signal phase input signal. Therefore, it is easy to implant circuits in an integrated circuit because the demodulation circuit can be constructed with a simple circuit compared with the demodulation system using the 90 degree phase shifter and the differentiating circuit. Here, consider the case that a high speed data communication. Discontinuous waveforms increase in the signal phase input signal, so that an accurate decoding operation cannot be obtained because phase shift operation is incomplete in the demodulator using the 90 degree phase shifter. Moreover, there is a defect that a detection accuracy decreases because the detection voltage of the low frequency signal in the demodulator using a differentiating circuit because the frequency of the base band signals are very broadly.

In the FSK demodulator of the invention, it is necessary to only judge whether the received baseband signal is in increasing direction or decrease direction of the signal level in the voltage change detection circuit, so that the circuit configuration is simple and tolerance is high against discontinuities in the FSK received signal for high speed data communication and decrease in detection accuracy is prevented if the baseband signal is of broadband.

In all embodiments of this invention, the received signal is FSK modulated. However, in the case that a signal resultantly demodulated by frequency shift modulation such as PSK modulation, is decoded, this FSK demodulator of this invention is effective.

Further, in each of embodiment of this inventions, explanation is done in the case that the demodulator is used in the receiver employing the direct conversion receiving system. However, assuming that the carrier is an intermediate frequency signal, the FSK data demodulator of this invention is applicable to a heterodyne receiver.

What is claimed is:

1. A demodulator for demodulating first and second baseband signals obtained from a received frequency shift keying signal, said first and second baseband signals having a quadrature relation therebetween, a lead and lag relation between said first and second baseband signals being changed in accordance with frequency shift from a carrier frequency of said frequency shift keying signal, comprising:
   (a) voltage change judging means for judging whether a magnitude of said first baseband signal increases or decreases within a time interval; and
   (b) inverting means responsive to an output of said voltage change judging means and said second baseband signal for outputting a demodulated signal produced by inverting said second baseband signal in accordance with said output of said voltage change judging means.

2. A demodulator as claimed in claim 1, wherein said inverting means inverts said second baseband signal when said magnitude of said first baseband signal increases.

3. A demodulator as claimed in claim 1, wherein said inverting means inverts said second baseband signal when said magnitude of said first baseband signal decreases.

4. A demodulator as claimed in claim 1, wherein said voltage change judging means comprising a voltage comparator having first and second inputs; a capacitor connected between said first input and the ground; a resistor connected between said first and second inputs, said second input and said resistor receiving said first baseband, said capacitor maintaining said magnitude of said first baseband signal in accordance with a time constant determined by said capacitor and said resistor.

5. A demodulator as claimed in claim 1, wherein said voltage comparator comprising an operational amplifier having a minus input used for said first input and a plus input used for said second input.

6. A demodulator as claimed in claim 1, wherein said inverting means further comprises an amplitude limiting amplifier for producing a binary output signal from said demodulated signal.

7. A demodulator as claimed in claim 6, further comprising a second amplitude limiting amplifier for waveshaping said output of said voltage change judging means to be sent to said inverting means.

8. A demodulator as claimed in claim 7, wherein said inverting means comprises a mixer for mixing said second baseband signal with said output of said voltage change judging means to produce said demodulated signal.

9. A demodulator as claimed in claim 7, wherein said inverting means comprises an Exclusive OR circuit, one input of said Exclusive OR responding to the waveshaped output of said voltage change judging means, the other input responding to said second baseband signal.

10. A demodulator as claimed in claim 1, further comprising:
   (a) second voltage change judging means for judging whether a magnitude of said second baseband signal increases or decreases within said predetermined interval;
   (b) second inverting means responsive to an output of said second voltage change judging means and said first baseband signal for outputting a second demodulated signal produced by inverting said first baseband signal in accordance with said output of said second voltage change judging means, and
   (c) combining circuit for combining said first mentioned demodulated signal with said second demodulated signal.

11. A demodulator as claimed in claim 10, wherein said combining circuit comprises a voltage comparator.

12. A demodulator as claimed in claim 10, wherein said voltage comparator comprises an operational amplifier.

13. A demodulator as claimed in claim 10, wherein said combining circuit comprises a voltage summing circuit.

14. A demodulator as claimed in claim 10, further comprising:
   (a) a first delay circuit for delaying said first mentioned demodulated signal for a given interval;
   (b) a second delay circuit for delaying said second demodulated signal for said given interval;
   (c) combining circuit for combining said first mentioned demodulated signal with said second demodulated signal;
   (d) switching signal generation means for detecting inflection points in said first and second baseband signals to output a inflection point detection signal having a pulse width two times said given interval approximately; and
   (e) switching means for selecting an output signal of said first delay circuit when said switching signal generation means detects a inflection point of said first base band signal; for selecting an output signal of said second delay circuit when said switching signal generation means detects a inflection point of said second base band signal; and for selecting an output signal of said combining circuit when said switching signal generation means detects no inflection point of said first and second base band signals.

15. A demodulator as claimed in claim 14, wherein said switching signal generation means comprises:
   (a) first and second amplitude limiting means for limiting amplitudes of said first and second baseband signals respectively;
   (b) first and second edge detection means for detecting lead and lag edges of outputs of said first and second amplitude limiting means respectively;
   (c) first and second pulse generation means for generating first and second pulses having pulse widths shorter than a half of a period of said first and second baseband signals in response to said first and second edge detection means respectively;
   (d) an Exclusive OR circuit for combining outputs of said first and second pulse generation means;
   (e) a first OR circuit for effective OR operation between an output of said Exclusive OR circuit and an output of said first pulse generation means to producing a first switching signal indicative of the presence of said inflection point in said first baseband signal, included in said inflection point detection signal;
   (f) a second OR circuit for effective OR operation between an output of said Exclusive OR circuit and an output of said second pulse generation means to producing a second switching signal indicative of the presence of said inflection point in said second baseband signal, included in said inflection point detection signal; and
   (g) an inverter for inverting said output of said Exclusive OR circuit to produce a third signal indicative of the absence of said inflection point in said first and second baseband signals, included in said inflection point detection signal.

16. A demodulator as claimed in claim 14, wherein said switching means comprises first to third three-state circuits for selecting said output signal of said first delay circuit when said switching signal generation means detects said inflection point of said first base band signal; for selecting said output signal of said second delay circuit when said switching signal generation means detects said inflection point of said second base band signal; and for selecting said output signal of said combining circuit when said switching signal generation means detects the absence of said inflection point of said first and second baseband signals respectively.

17. A demodulator as claimed in claim 14, wherein said switching means comprises first to third analog switches for selecting said output signal of said first delay circuit when said switching signal generation means detects said inflection point of said first base band signal; for selecting said output signal of said second delay circuit when said switching signal generation means detects said inflection point of said second base band signal; and for selecting said output signal of said combining circuit when said switching signal generation means detects the absence of said inflection point of said first and second baseband signals respectively.

18. A demodulator as claimed in claim 1, further comprising:
   (a) an automatic gain controlled amplifier for amplifying the received frequency shift keying signal; and
   (b) quadrature signals generation means for generating said first and second baseband signals; wherein said inverting means inverts said second baseband signal when said magnitude of said first baseband signal increases.

19. A demodulator for demodulating first and second baseband signals obtained from a received frequency shift keying signal, said first and second baseband signals having a quadrature relation therebetween, a lead and lag relation between said first and second baseband signals being changed in accordance with frequency shift from a carrier frequency of said frequency shift keying signal comprising:
   (a) voltage change judging means for judging whether a magnitude of said first baseband signal increases or decreases within a time interval; and
   (b) inverting means responsive to an output of said voltage change judging means and said second baseband signal for outputting a demodulated signal produced by inverting said output of said voltage change judging means in accordance with said second baseband signal.

20. A demodulator as claimed in claim 19, further comprising:
   (a) second voltage change judging means for judging whether a magnitude of said second baseband signal increases or decreases within said predetermined interval;
   (b) second inverting means responsive to an output of said second voltage change judging means and said first baseband signal for outputting a second demodulated signal produced by inverting said output of said second voltage change judging means in accordance with said first baseband signal, and
   (c) combining circuit for combining said first demodulated signal with said second demodulated signal.

21. A demodulator as claimed in claim 20, wherein said combining circuit comprises a voltage comparator.

22. A demodulator as claimed in claim 20, wherein said voltage comparator comprises an operational amplifier.

23. A demodulator as claimed in claim 20, wherein said combining circuit comprises a voltage summing circuit.

24. A demodulator as claimed in claim 20, further comprising:
   (a) a first delay circuit for delaying said second mentioned demodulated signal for a given interval;
   (b) a second delay circuit for delaying said first demodulated signal for said given interval;
   (c) combining circuit for combining said first mentioned demodulated signal with said second demodulated signal;
   (d) switching signal generation means for detecting inflection points in said first and second baseband signals to output an inflection point detection signal having a pulse width two times said given interval approximately; and
   (e) switching means responsive to said inflection point detection signal for selecting an output signal of said first delay circuit when said switching signal generation means detects said inflection point of said first baseband signal; for selecting an output signal of said second delay circuit when said switching signal generation means detects said inflection point of said second baseband signal; and for selecting an output signal of said combining circuit when said switching signal generation means detects the absence of said inflection point of said first and second baseband signals.

25. A demodulator as claimed in claim 24, wherein said switching signal generation means comprises:
   (a) first and second amplitude limiting means for limiting amplitudes of said first and second baseband signals respectively;
   (b) first and second edge detection means for detection lead and lag edges of outputs of said first and second amplitude limiting means respectively;
   (c) first and second pulse generation means for generating first and second pulses having pulse widths shorter than a half of a period of said first and second baseband signals in response to said first and second edge detection means respectively;
   (d) an Exclusive OR circuit for mixing outputs of said first and second pulse generation means;
   (e) a first OR circuit for effective OR operation between an output of said Exclusive OR circuit and an output of said first pulse generation means to producing a first switching signal indicative of the presence of said inflection point in said first baseband signal, included in said inflection point detection signal;
   (f) a second OR circuit for effective OR operation between an output of said Exclusive OR circuit and an output of said second pulse generation means to producing a second switching signal indicative of the presence of said inflection point in said second baseband signal, included in said inflection point detection signal; and
   (g) an inverter for inverting said output of said Exclusive OR circuit to produce a third signal indicative of the absence of said inflection point in said first and second baseband signals, included in said inflection point detection signal.

26. A demodulator as claimed in claim 24, wherein said switching means comprises first to third three-state circuits for selecting said output signal of said first delay circuit when said switching signal generation means detects said inflection point of said first base band signal; for selecting said output signal of said second delay circuit when said switching signal generation means detects said inflection point of said second base band signal; and for selecting said output signal of said combining circuit when said switching signal generation means detects the absence of said inflection point of said first and second baseband signals respectively.

27. A demodulator as claimed in claim 24, wherein said switching means comprises first to third analog switches for selecting said output signal of said first delay circuit when said switching signal generation means detects said inflection point of said first base band signal; for selecting said output signal of said second delay circuit when said switching signal generation means detects said inflection point of said second base band signal; and for selecting said output signal of said combining circuit when said switching signal generation means detects the absence of said inflection point of said first and second baseband signals respectively.

28. A demodulator for demodulating a received frequency shift keying signal, comprising:
   (a) an automatic gain control amplifier for amplifying said received frequency shift keying signal with gain controlled automatically;
   (b) baseband signal generation means responsive to said automatic gain control amplifier for generating first and second baseband signal, said first and second baseband signals having a quadrature relation therebetween, a lead and lag relation between said first and second baseband signals being changed in accordance with frequency shift from a carrier frequency of said frequency shift keying signal;
   (c) voltage change judging means for judging whether a magnitude of said first baseband signal increases or decreases within a time interval; and
   (d) inverting means responsive to an output of said voltage change judging means and said second baseband signal for outputting a demodulated signal produced by inverting said second baseband signal in accordance with said output of said voltage change judging means.

* * * * *